March 1, 1966 M. GLANTZ 3,237,971

HOLDER FOR RECORD SHEETS AND RECORD SHEETS THEREFOR

Filed March 19, 1963 6 Sheets-Sheet 1

Miriam Glantz

INVENTOR.

BY J. N. Mills

ATTORNEY

HOLDER FOR RECORD SHEETS AND RECORD SHEETS THEREFOR

Filed March 19, 1963 6 Sheets-Sheet 2

Miriam Glantz
INVENTOR.
BY
ATTORNEY

HOLDER FOR RECORD SHEETS AND RECORD SHEETS THEREFOR

Filed March 19, 1963

Miriam Glantz
INVENTOR.

BY J. W. Mills
ATTORNEY

March 1, 1966 M. GLANTZ 3,237,971

HOLDER FOR RECORD SHEETS AND RECORD SHEETS THEREFOR

Filed March 19, 1963 6 Sheets-Sheet 4

Miriam Glantz
INVENTOR.

BY J. W. Malls
ATTORNEY

March 1, 1966 M. GLANTZ 3,237,971

HOLDER FOR RECORD SHEETS AND RECORD SHEETS THEREFOR

Filed March 19, 1963 6 Sheets-Sheet 5

Miriam Glantz

INVENTOR.

BY J. M. Mills

ATTORNEY

HOLDER FOR RECORD SHEETS AND RECORD SHEETS THEREFOR

Filed March 19, 1963 6 Sheets-Sheet 6

Miriam Glantz
INVENTOR.

BY J. W. Wall
ATTORNEY

United States Patent Office 3,237,971

Patented Mar. 1, 1966

3,237,971

HOLDER FOR RECORD SHEETS AND RECORD SHEETS THEREFOR

Miriam Glantz, 188 W. Hanover St., Trenton, N.J.

Filed Mar. 19, 1963, Ser. No. 267,382

9 Claims. (Cl. 282—29)

This invention relates generally to devices and systems employing multiple entries for bookkeeping and other records; and also to record sheets to be taken from ledgers, journals and the like and for the sheets while entries are being typed or otherwise written thereon, the sheets being then replaced in the ledger or other book to be held until the time for writing additional entries on the sheets.

This application is a continuation-in-part of my copending application, Serial No. 232,642 filed October 12, 1962, for Record Sheet Holder and Record Sheets Therefor, which application is now abandoned in favor of the instant application.

One of the principal objects of the present invention is to provide an alignment holder especially adapted for entering records on multiple sheets in a typewriter, bookkeeping machine, cash register, flexowriter, and other machines or instruments which this invention may be fitted into use with, as well as handwritten entries, in such a manner that the space to be written upon next on each sheet in the group or set is in the correct position for typing, irrespective of how far up or down the sheet this might be. The holder may be made of any material which is thin enough to pass through the rollers of typewriters or other machines together with a plurality of sheets inserted in the holder. Holders for sheets on which all entries are to be handwritten may be made of heavier, stiffer material.

A further object of this invention is to provide a special group or set of record sheets with coordinated transverse and horizontal lines or writing spaces, headings or other reference matter, and also with means at their edges cooperative with means on the holder referred to for firmly anchoring the individual sheets in the holder in predetermined positions in relation to the holder and one another in such a manner that the anchoring means will not obstruct the passage of the holder and attached sheets through the rollers of typewriters and other machines or instruments. My invention may also include a positioning guide on at least one of the margins of said holder cooperative with the reference matter on the sheets in placing the sheets in the holder in predetermined relation with the holder and with one another, and the cooperative means for holding the sheets to the holder constructed and arranged so as to facilitate the quick removal of the sheets from the holder.

In certain embodiments of my invention, at least one edge of the holder is provided with rows of openings, notches, slots or other formations equidistantly spaced to correspond to the transverse lines or writing spaces on the special record sheets. At least one longitudinal edge of the holder is provided intermediate its ends with a sheet positioning guide mark or other sheet positioning indicator adapted to be aligned with one of the visible spaces or characters on any of the record sheets. The sheets may also be provided with pairs of projections extending outwardly of at least one edge of the sheet, and so arranged that when the positioning guide is aligned with a horizontal line space or other reference matter at least one projections formation will be in registry with at least one of the correct openings or other formations and can easily be engaged therewith. The projection is necessarily of suitable material and of the correct size to slide easily through and under the opening or other formation, as between a pair of clips, or other projections, and thus secure the sheet against endwise movement in the holder. In other parts of my invention the projections on certain papers are dispensed with, and notched edges or corners of these papers are inserted under horizontal, vertical or diagonal clips, in diagonal slots or other holding means inwardly from the margins, of the holder. Similar clips, slots or other means may be provided in certain blank sheets. If desired, ledgers and similar books may be supplied with blank sheets or transversely spaced strips provided with clips of the type mentioned, as well as modifications herein mentioned, for locking the sheets in the book in a manner to facilitate quick removal of the sheets therefrom.

In certain other embodiments of my invention I provide separate auxiliary record sheet carriers which are cooperative with the principal holder, for holding sheets of different widths in the holder in properly assembled relation, and also in other forms for holding sheets in properly assembled relation without the use of projections of the margins of the sheets, as for example, with notches in the edges of the record or other face sheets for coengagement with clips on the holder.

One particular advantage of the present invention is that it will enable persons who have not had bookkeeping training or experience to keep an adequate bookkeeping record. Moreover, since the only mechanical equipment required is an ordinary typewriter, bookkeeping machine, or other machines or instruments which are adaptable, the invention provides a very economical means of keeping such records. By such method the records are kept up to date at all times, inasmuch as it eliminates the need for two or more postings of the same information. Also, since the holder permits all entries to be made on a typewriter, bookkeeping or other machine, or instrument, the entries can not only be made more rapidly but more legibly than handwritten entries.

Because of the fact that entries are made on all sheets of a set with one typing or writing, the possibility of error, such as occurs when posting the same item from an original entry to other sheets, such, for example, as posting to the wrong side of an account or posting the wrong figure, is practically eliminated. This also saves time since when posting similar information at different times it would be necessary to look at each column to make sure that it is posted to the proper one. Also, because the original typing gives the name of the account, employee, product or name of the ledger sheet or account, an error if made in posting the wrong account could be found so easily as to require little or practically no time to find it; whereas, under previous sytsems it is necessary to check each posting from the book of original entry with each account until the error is found, which may require long periods of search. This invention also by supplying the same information on all sheets at the same time as is noted in the books of original entry renders it unnecessary to refer to books of original entry to get information desired on account, since it is already apparent.

Other objects and advantages of my invention will be apparent from the following specification and reference to the accompanying drawing forming a part thereof in which.

Figures 21, 22, 23:
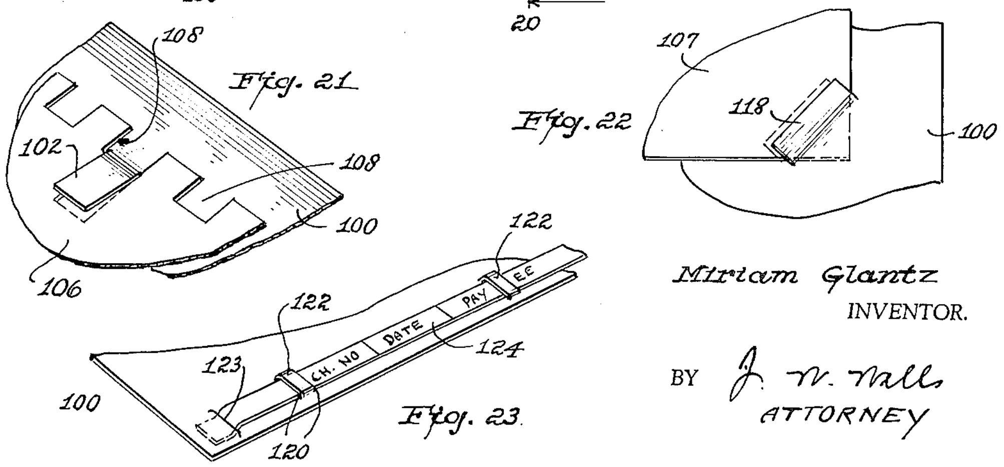
FIG. 21 is a detail perspective showing the formation of the clips for attaching regular sheets of a set and also carbon sheets to the holder.
Figures 24, 25, 26, 33:
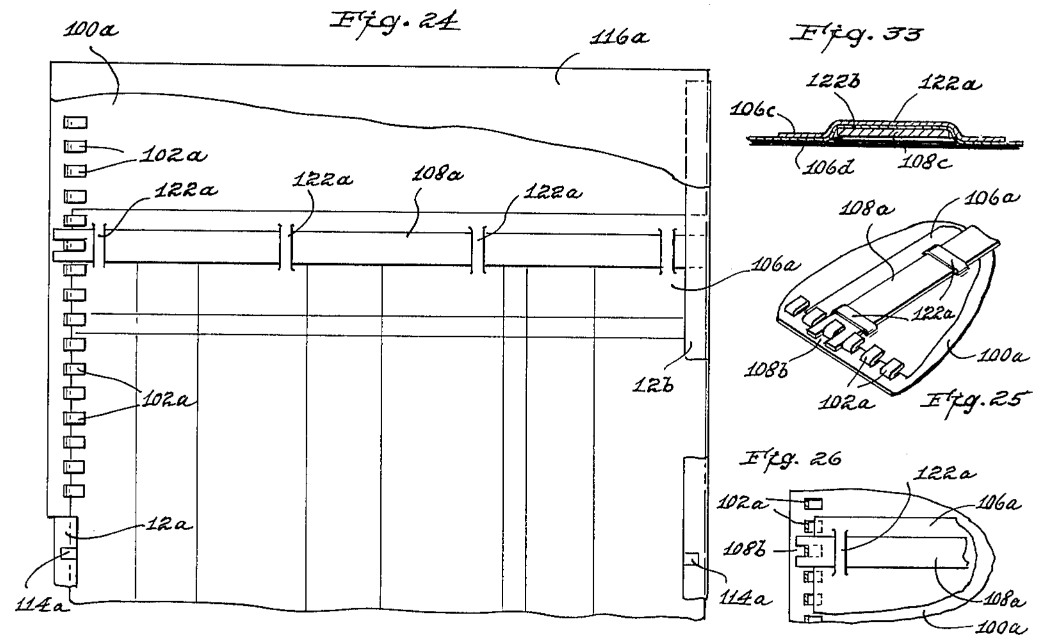
Figures 27, 28, 29:
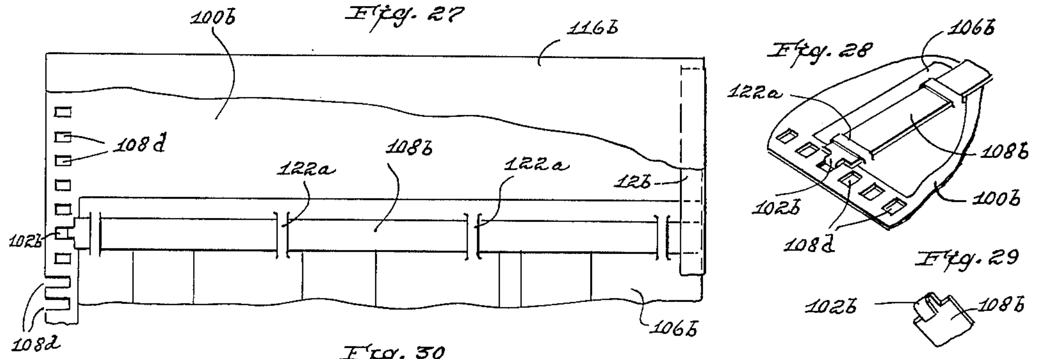
Figure 30:
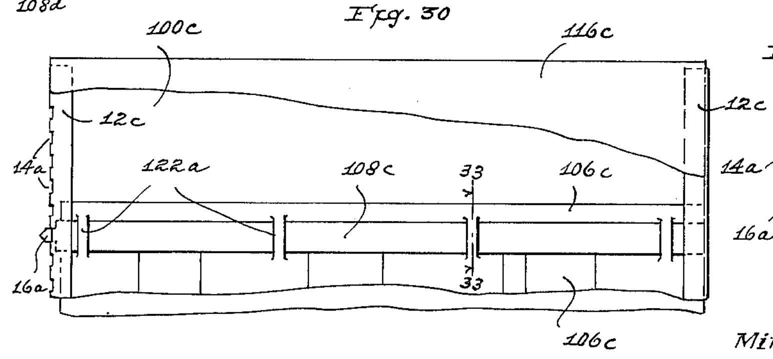
Figure 31:
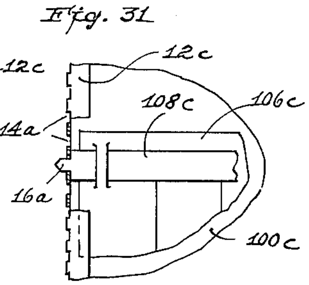
Figure 32:
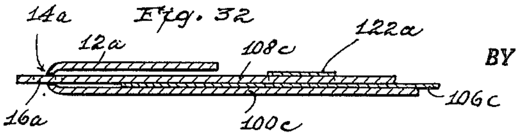

FIG. 22 is a detail view showing the formation of projections in the form of clips on either the holder, the carrier, or the regular sheets for attaching sheets or papers which do not have other coengaging means than the square corners of the sheets themselves, since such sheets, consisting of checks, receipts and the like, would be entered upon only once and be given to some one else for their records, and/or for attaching sheets of irregular width to the holder and/or carrier;

FIG. 23 is a detail perspective view showing the column heading guide strip and means of attaching it to the flap of the holder;

FIG. 24 is a detail plan view showing another modified form of my invention;

FIG. 25 is a detail perspective view of the modification shown in FIG. 24;

FIG. 26 is a detail plan view of the modification shown in FIGS. 24 and 25 with the clips on the holder shown in horizontal section;

FIG. 27 is a detail plan view showing another modification of my invention;

FIG. 28 is a detail perspective view of the modification shown in FIG. 27;

FIG. 29 is a detail perspective view of the sheet supporting element shown in FIGS. 27 and 28;

FIG. 30 is a detail plan view showing another modification of my invention;

FIG. 31 is another detail plan view showing the apertured fold of the holder in sectional plan; and FIG. 32 is an enlarged transverse section taken longitudinally through the sheet supporting element of the modification shown in FIGS. 30 and 31.

FIG. 33 is a detail section taken on the line 33—33 of FIG. 30 but showing a carbon sheet attached to a record sheet by means of the same strip carrying the formation for coengagement with a formation on the holder.

Figures 34, 35, 36, 37, 38, 39, 40, 41, 42:
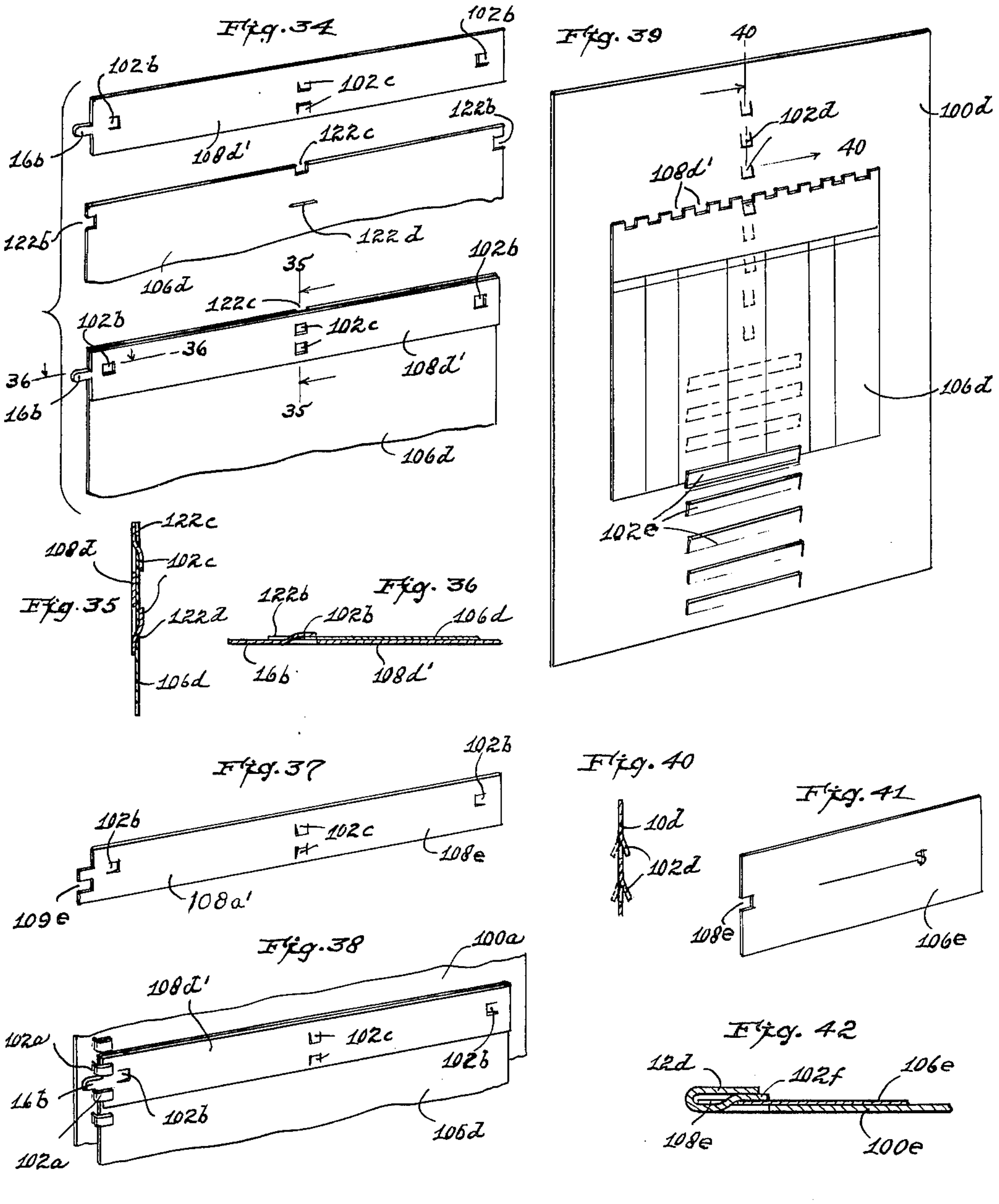

FIG. 34 is an exploded perspective view showing a modified form of a sheet supporting strip, or carrier, and the manner of the attachment of it to a record sheet;

FIG. 35 is an enlarged section taken on the line 35—35 of FIG. 34;

FIG. 36 is an enlarged section taken on the line 36—36 of FIG. 34;

FIG. 37 is a perspective view of a sheet supporting strip, or carrier, similar to that shown in the previous views but with a notch for engagement with a projection in the form of a clip on the holder, instead of a projection for insertion in an aperture in the holder;

FIG. 38 is a perspective view of a carrier strip similar to that shown in FIG. 34, but with the projection thereon designed for insertion between two clips or other projections on the holder;

FIG. 39 is a perspective view of a modified form of sheet holder;

FIG. 40 is a section taken on the line 40—40 of FIG. 39;

FIG. 41 is a perspective view of a check or the like for only a single typing of information thereon and provided with a notch or opening for quick engagement with a clip on the holder or a carrier attached to the holder;

FIG. 42 is a detail sectional view showing a holder having a clip for engagement with the notch or the like in the check or other sheet shown in FIG. 41.

Figures 43, 44:
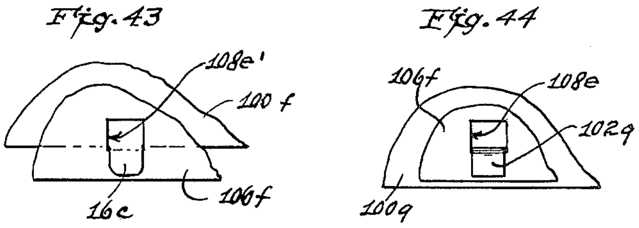

FIG. 43 is a detail plan showing a sheet holder with an outwardly extending projection on one edge in close interfitting engagement with an opening in a face sheet;

FIG. 44 is a view similar to FIG. 43 showing a sheet holder having another form of outwardly extending projection or clip in close interfitting engagement with an opening in a face sheet.

Referring to the drawing in which like numerals designate like parts in the several views, 10 is the holder which may be made of thin sheet plastic or other suitable material having the qualities hereinbefore mentioned, or of any flat sheet material, and allowing the record, holder and any carriers to pass through any of the machines, or used with instruments referred to, and which may be bent along its edges to form flanges 12 overlapping the longitudinal margins of the holder, and which are provided along their outer edges with equidistantly spaced apertures 14, formed in the junctures between the holder and flanges, and which, in the embodiment of the invention illustrated may be formed by bending and then punching semicircular or square holes in a row inside the edge or on any desired portion of the sheet. However, the apertures may be of any desired shape to accommodate anchoring projections or flat pointed pins 16 fastened to the edges of the sheets 18, and extending outwardly therefrom. In the form illustrated these projections are secured to the bottom of the sheet by means of adhesive sheets 17 and extend outwardly through slits 20 in the sheet so that the engaging part of the projection lies on top of the record sheet. The slits in the sheet are designed to impart a greater degree of rigidity to the projections. They may, however, be secured to the sheet in various ways, either on the bottom or the top of the sheet. The most important requisite is that they fit closely but loosely in the apertures when inserted therethrough, so that they not only will hold the sheets against endwise movement under the flanges 12 but can be easily withdrawn from the apertures. The flanges 12 are provided with a pair of transversely opposite positioning guides 22 intermediate their ends for an important purpose in cooperation with certain features of the special record sheets designed for use with the holder referred to, as will now be described. However, in most instances a positioning guide on only one edge will suffice.

Figures 1, 2, 3, 4, 5, 6, 7, 8, 9:
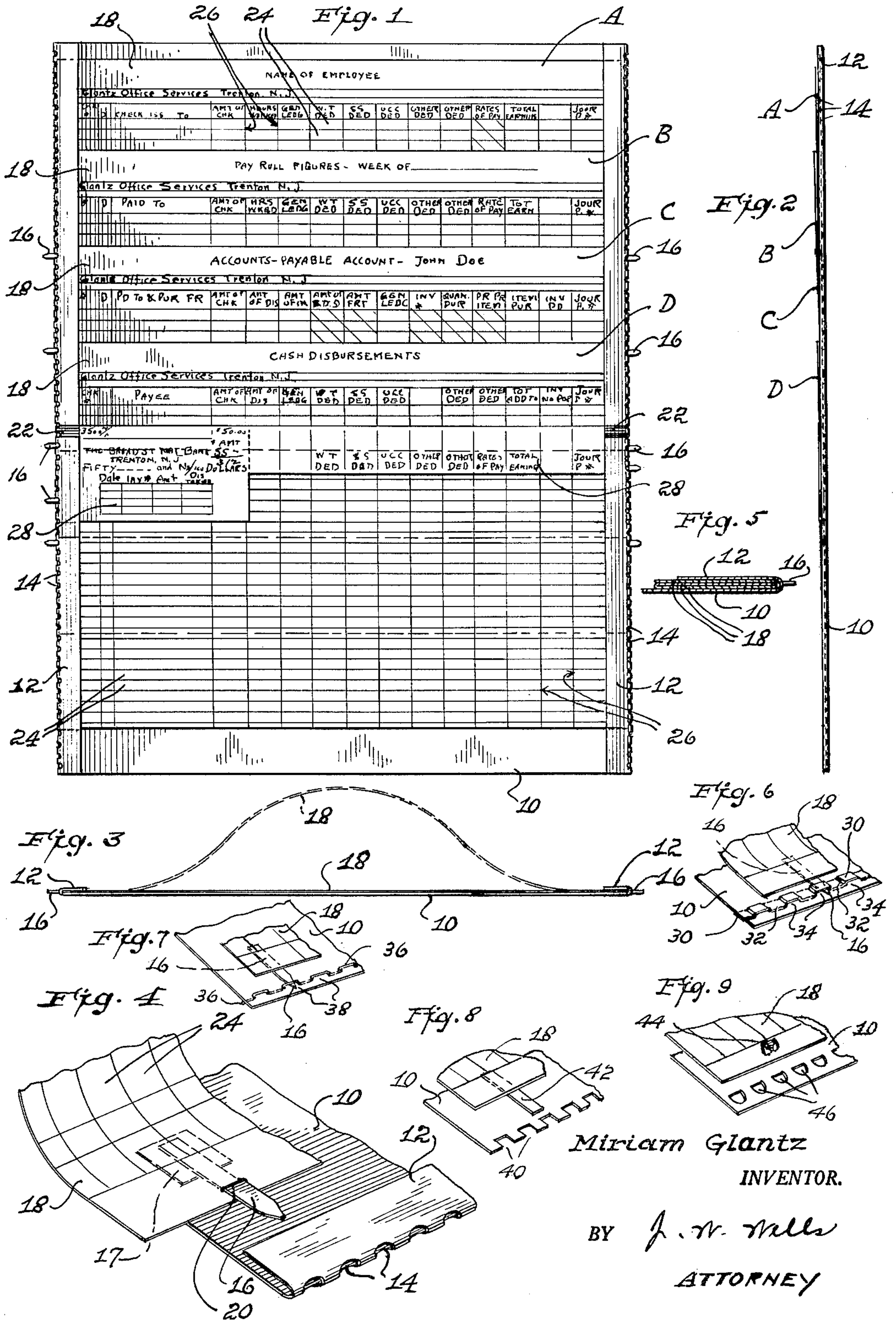
FIG. 1 is a top plan view of one form of my invention with a check (having perforated tear-off) and four bookkeeping record sheets held therein or thereon in proper relative positions for making an entry.
FIG. 2 is a side elevation of FIG. 1.
FIG. 3 is an end view of FIG. 1, but, for greater clarity of illustration, showing only one of the record sheets in the holder.
FIG. 4 is a detail perspective view showing one form of construction of the holder and the record sheets.
FIG. 5 is a detail section through one side of the holder shown in FIGS. 1 to 4 with a number of record sheets therein.
FIGS. 6, 7, 8 and 9 are detail perspective views showing modified forms of my invention.
Figure 10:
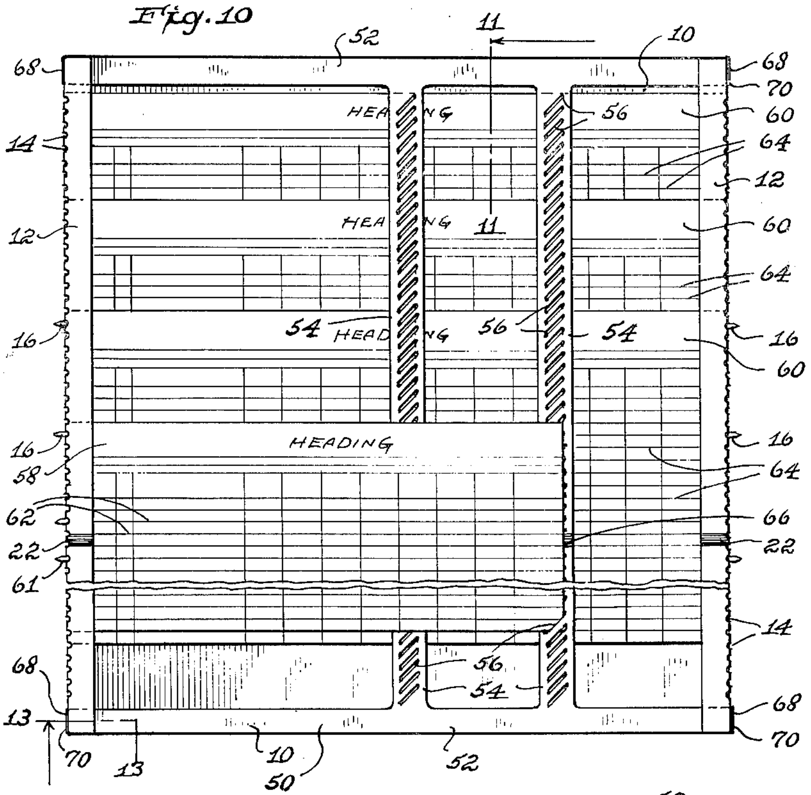
FIG. 10 is a top plan view similar to FIG. 1, but showing an auxiliary record sheet holder or carrier in the form of a thin flexible frame attached to the principal holder.
Figure 11:
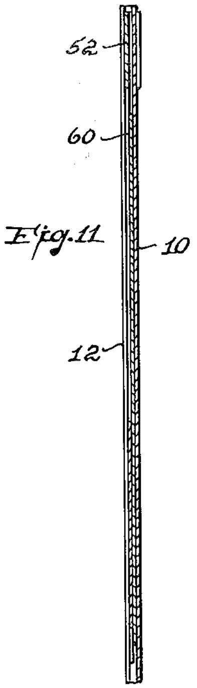
FIG. 11 is an enlarged section taken on the line 11—11 of FIG. 10.
Figure 12:
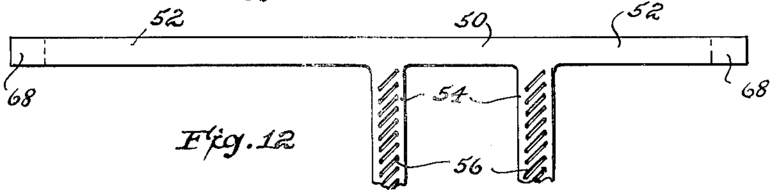
FIG. 12 is a detail plan view showing the top portion of the auxiliary frame or carrier.
Figure 13:
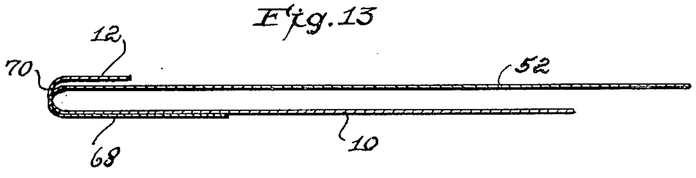
FIG. 13 is an enlarged detail view of a portion of one of the longitudinal connecting portions of the auxiliary frame.
Figure 14:
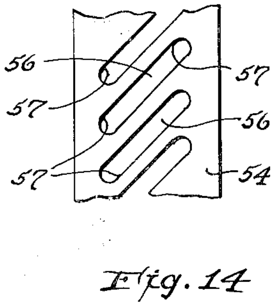
FIG. 14 is an enlarged detail view of a portion of the slotted frame shown in FIG. 12.
Figure 15:
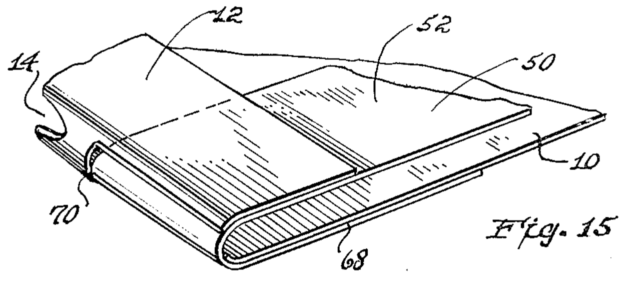
FIG. 15 is an enlarged detail view in perspective showing one corner of the assembled holder shown in FIG. 10.

In FIGS. 1 and 2, four record sheets 18, designated A, B, C and D are shown in the holder 10. Sheets may be used which require no carbon, although sheets requiring carbon may be used if desired so that characters written on the top sheet will be duplicated on each of the underneath sheets. The differently identified sheets in a group or set may have various column headings, as indicated, but the column items on the various sheets are so coordinated that when the underneath sheets are arranged in the holder in predetermined relation with the spaces 24 of all the sheets of a set in which identical information is to be written aligned with the marks 22, constituting the sheet positioning guides, the information typed (or handwritten) on the top sheet will be duplicated in the correct transverse line spaces 24 and columns 26 on all the underneath sheets. It should be mentioned that because of the thinness of the holder and of the record sheets, which cannot be properly illustrated in a small scale drawing, the holder with ten or more sheets can easily be passed through the rollers of the typing machine.

The transverse line spaces 24 are preferably of uniform width on all sheets of a group or set, and either the spaces or one of the lines thereof may be used in conjunction with the marks 22 in locating the sheet in the holder. However, the guide marks 22 on the holder may be of any desired form or in any desired location on the holder. Also characters on the record sheets other than the space lines may be used in conjunction with the marks 22. For example, it will be noted in FIG. 1 that the upper edges of the rectangular marks 22 coincide with the top line of a space 24, of the top sheet D, which is shown covered by a check 28. The operator will already have placed sheets A, B and C in the holder in the order mentioned with the guide marks 22 in coincidence with the spaces in which information, to be typed on the top sheet in line with the guide marks, is to be duplicated. It will also be seen that in the case illustrated the same type of line space was used in conjunction with the guide marks 22 for positioning both record sheet D and the check 28 in the holder.

When the typing (or handwritten) entries are completed, the operator can quickly remove the set of sheets from the holder by passing a hand under the middle of the bottom sheet 18 and lifting, as indicated in broken lines in FIG. 3, thus withdrawing the projections 16 of all the record sheets in the holder from the apertures 14.

The openings in the edges of the holder 10 for coengagement with the projections 16 may be in various formations other than those described. For example, as shown in FIG. 6, narrow strips 30 made of flexible material may be woven through slots 32 in the holder 10 in overlapping relation to form equidistantly spaced lateral openings 34 to receive the projections 16 of the record sheets 18. As shown in FIG. 7, wires or threads 36 may be threaded through the holder along its longitudinal edges in overlapping relation to form equidistantly spaced openings 38 to receive the projections 16. As shown in FIG. 8, notches 40 may be formed in the edges of the holder, and projections 42, which may be attached to the sheets 18 or formed integrally therewith may be inserted in the correct slots and bent under the holder to anchor the sheets in position (the bent engaging relation not being illustrated). Conversely the notches 40 may be in the record sheet and the projections 42 on the holder 10, in which case the projections would be bent upwardly over the record sheets. As shown in FIG. 9, short depending tabs 44 may be punched in the sheets 18 and inserted in one of the openings 46 punched along the edges of the holder 10. In the four forms described above, the flanges 12 may be omitted.

In the embodiment of my invention illustrated in FIGS. 10 to 15 an auxiliary record sheet holder or carrier in the form of a thin flexible frame 50 is attached to the principal holder 10. This frame may consist of a pair of opposite transversely arranged end portions 52 connected by one or more longitudinally extending connecting portions 54 provided with longitudinal rows of diagonally disposed slots 56, which may be rounded at their ends, as more clearly shown at 57 in FIG. 14, and spaced according to the spacing of the apertures 14 in the principal holder 10. The frame 50 is specially designed for cooperation with the principal 10 in attaching to that holder a sheet 58 of lesser width than the other, longer, sheets 60 of a set. The narrower sheet is provided on only one marginal edge with a projection 61, corresponding to the projections 16 shown in FIG. 1, this projection being adapted for insertion in either of the apertures 14 of the holder 10. The opposite edge of the sheet 58 is detachably secured to one of the connecting portions 54 of the frame 50 by inserting a corner of the sheet into one of the slots 56. The transverse lines 62 of the sheet 58 are spaced in accordance with the lines 64 of the wider sheets 60 in the set, and all the lines are spaced in accordance with the spacing of the apertures 14 in the principal holder 10. The connecting portions 54 of the frame 50 are also provided with positioning marks 66 or other means corresponding to the marks 22 on the principal holder 10, by means of which the sheets are assembled in desired overlapping relation in cooperation with the transverse lines 62 and 64. Although only two connecting portions 54 are shown in the drawing it should be understood that as many may be provided as required to accommodate sheets of different widths. As shown more clearly in FIGS. 13 and 15, the frame or carrier 50 is attached to the principal holder by means of extensions 68 of the end portions 52, which pass through slots 70 in the ends of the principal holder 10, underneath the marginal flanges 12, and are folded thereunder and fixedly secured to the bottom 10 by adhesive or other suitable means. The longer sheets 60 are passed underneath, or between the frame 50 and the principal holder 10 and attached to the latter by engagement of the projections 16 with the apertures, as previously described in connection with FIGS. 1 and 4. The frame 50 is made of such thin material that the transcription on the set of record sheets is not impaired by typing across the connecting portions 54.

Figure 16:
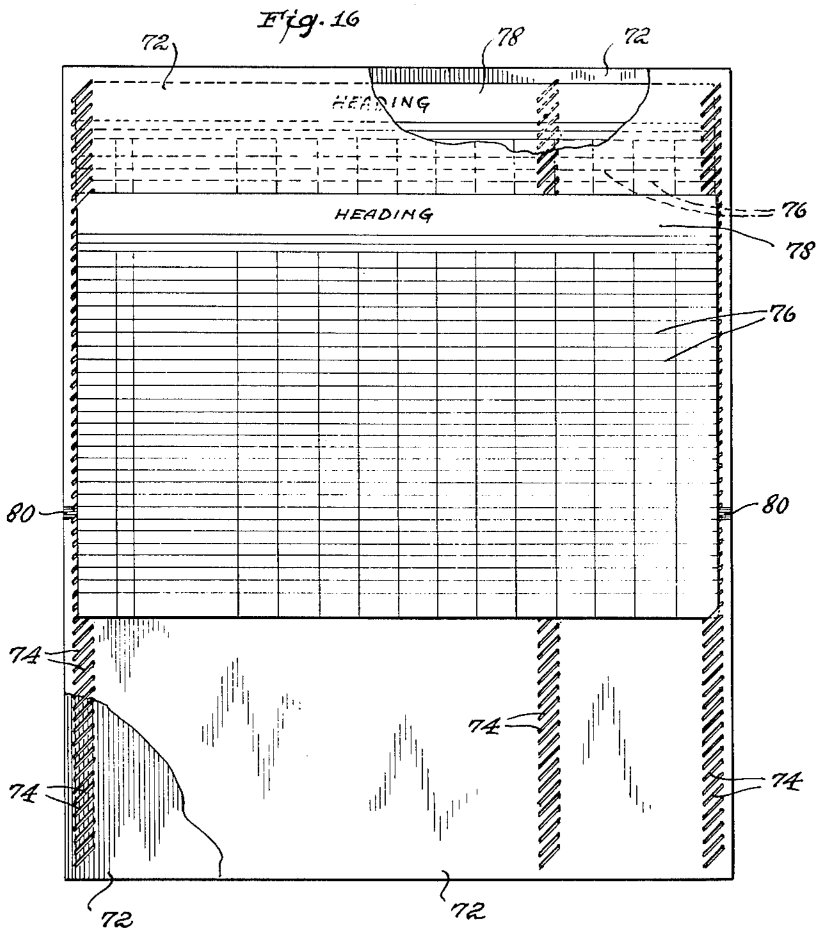
FIG. 16 is a top plan view partly broken away showing another form of auxiliary record sheet holder or carrier.
Figure 17:
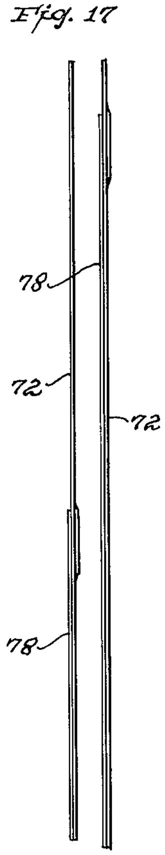
FIG. 17 is an edgewise view of two of the auxiliary holders illustrated in FIG. 16, each with a record sheet attached in proper relation for insertion in the principal holder.

Another form of auxiliary holder or carrier 72 is shown in FIGS. 16 and 17. The holder is provided in its opposite margins with longitudinal rows of elongated diagonal slots 74 which are spaced in accordance with the apertures 14 in the principal holder 10 and with the lines 76 on the record sheets 78. Intermediate rows of slots may be provided, as shown. The sheets 78 are attached to the auxiliary holders or carriers by inserting corners of the sheets on opposite sides in registering slots 74. Narrower sheets may be attached by inserting a corner on one side in one of the intermediate slots. Each holder 72 is provided with transversely opposite positioning guides 80 for cooperation with the lines 76 in placing a record sheet 78 in the correct relation for transcribing on the desired line. In this form of the invention an auxiliary holder or carrier is used for each record sheet of the set. The set may then be placed in a machine and the typing performed in the usual manner. With the auxiliary holders described above the necessity for projections on the margins of the record sheets is entirely obviated.

Figure 18:
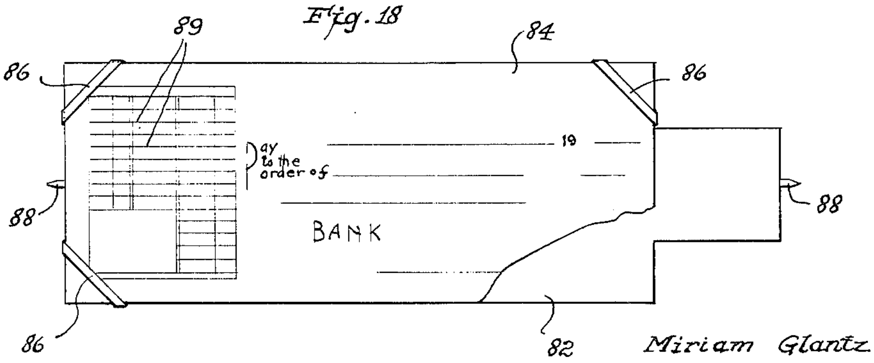
FIG. 18 is a plan view, partly broken away, showing an auxiliary sheet holder or carrier with a check blank attached thereto ready for insertion in the principal holder.

In FIG. 18 is shown a carrier 82 for checks or other papers 84, which are to be written upon usually once, and/or papers which are of different widths. This carrier is provided with diagonal strips or other suitable elements 86 at the corners under which the corners of the checks, receipts, and the like, and/or papers of various widths are inserted to hold them in coincident relation with the carrier. The carrier may be provided with projections 88 at its ends for insertion in the apertures 14 of the principal holder 10, in overlapping relation with other record sheets of a set. The spacing of the lines 89 correspond to the spacing of the transverse lines on the other sheets of a set.

The papers 84, as well as any papers of a set may be entirely blank, in which case lines of typing would take the place of the transverse lines 89 in cooperation with at least one of the positioning guides 22, since these guides may be aligned with the spaces below the typed lines on placing the sheets in the carriers 82 in predetermined relation, instead of with spaces between ruled lines. For example, after the first line is typed at the top of a sheet one of the positioning guides 22 can be aligned by sight of the typist with the space immediately below that line without the necessity of relying upon ruled lines or other references on the sheet.

Figure 19:
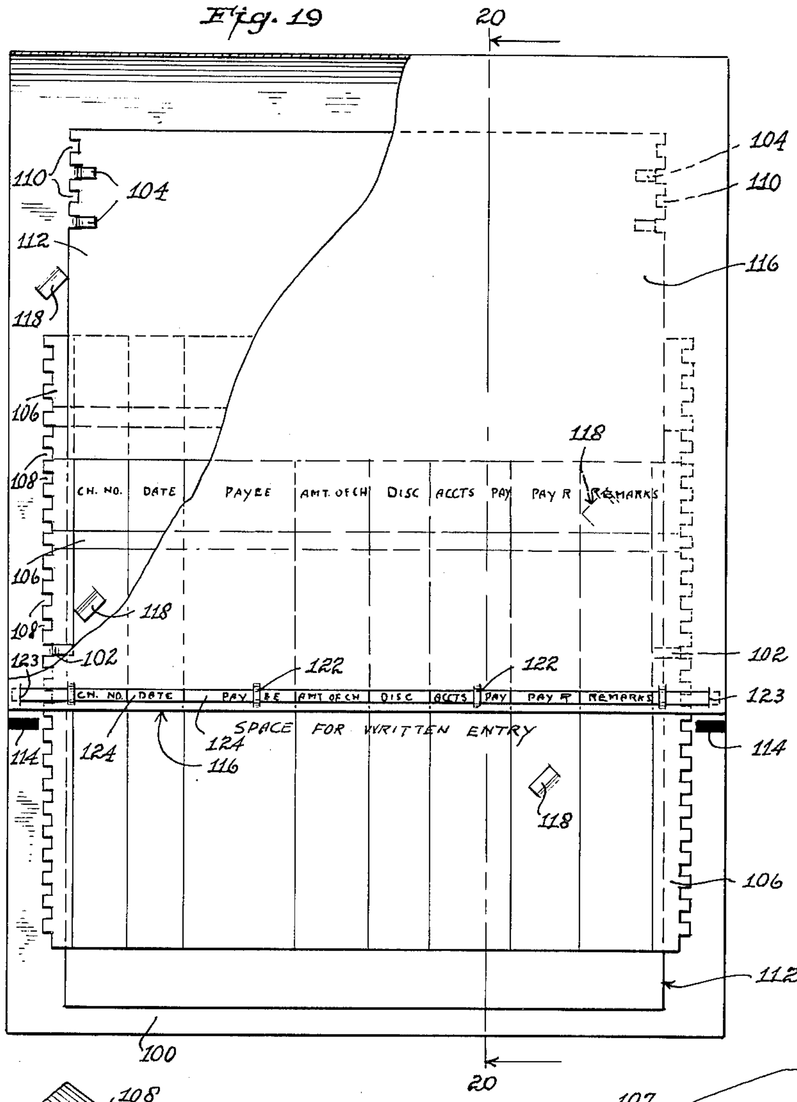
FIG. 19 is a top plan view, partly broken away, showing a modified form of holder and sheets.
Figure 20:
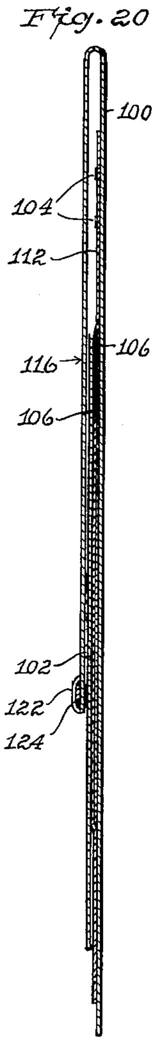
FIG. 20 is a section taken on the line 20—20 of FIG. 19.

In FIGS. 19 and 20 is shown a holder 100, which may be made of plastic or other suitable sheet material, and having one to three pairs of transversely spaced projections in the form of clips 102 a substantial distance below its upper end inwardly from its marginal edges and also having near its upper end similar pairs of clips 104 spaced inwardly from the other clips. The first mentioned clips are for engagement with regular sheets 106 of a set upon which entries are to be written. These sheets are provided at their longitudinal edges with rectilinear openings in the form of notches 108 into which the clips fit to hold the sheets against longitudinal and lateral movement in the holder. The second clips are for engagement with similar notches 110 in carbon sheets 112, if such are used, to hold them in fixed position on the holder 100. For that purpose a lesser number of notches than those of the regular sheets, as shown in FIG. 1, is sufficient. The clips 102 and 104 are preferably formed integrally with the holder by cutting out the sides and the inwardly projecting ends, leaving the other end as part of the holder, as shown more clearly in FIG. 21. In order to attach a sheet 106 it is necessary only to align the space in which an entry is to be written with one of the positioning guides 114 and slide the corresponding notched portion 108 under one of the clips 102. The attachment of the carbon sheets is similar, except that no positioning guide is necessary, and except that preferably at least two transversely opposite clips 104 are engaged with at least two transversely opposite notches in each carbon sheet. As many sheets 106 as desired may be attached as described; and carbon sheets 112 can be easily attached to the upper clips for each sheet 106 requiring a carbon.

From the foregoing description it will be seen that the form of holder illustrated corresponds generally to the form of my invention illustrated in FIG. 8, except in reverse. Obviously the entire cooperative arrangement of the interlocking elements may be substantially reversed by providing one or two opposed pairs of projections, instead of a continuous series of notches in the edges of the holder, with a continuous series of clips spaced to receive the projections on the sheets therebetween. With either arrangement it is necessary for the user to watch only the line space of writing at the point of one positioning guide, for correct interlocking coengagement with the coengageable elements in the other member to be attached in coordination with the sheet positioning guides 114.

The holder 100 may be of sufficient length to provide for a return bent flap 116 extending downwardly to a plane where it will cover not only the upper clips 104 but also the lower clips 102, the flap terminating just above the positioning guides 114. This integral flap not only prevents the clips from interfering with the insertion of the holder and attached sheets into a typewriter or other machine or instrument, but also protects the clips from being broken through contact with mechanical parts of the machine. Another purpose of the flap 116 is to keep the record sheets in a flattened position when picked up and while being inserted in a typewriter or other similar machine.

The lower end portion of the flap 116 may be provided with pairs of slits 120 forming loops 122 through which is threaded a strip 124 bearing correctly positioned column headings, which may be printed, typed or written thereon applicable to all the sheets of a set. The ends of the strips may be inserted through single slits 123. These visible headings being immediately above the positioning guides 114 (which fix the location of the space in which entries are being written) the operator is not required to look upwardly at the headings on the regular sheets of the set, which even when not hidden from view (as when using a transparent material) might still require great eye concentration to stay within the column shown at the top of the sheet and place figures in the same column at a considerable distance below the column heading. In any case such a guide strip directly above the position where figures are to be written not only facilitates the typing operation but ensures proper placing of the entries. If desired, the strip 124 may be omitted and the column headings typed directly on the flap 116.

The holder 100 may also be provided with diagonally arranged clips 118 for engagement with two or more corners of such papers as checks, receipts, and the like, usually written on only once and on which it would not be desirable to provide such paper with notches on their edges. Those diagonally arranged clips may also be employed for coengagement of the corners of additional irregular sheets 107. These clips are preferably formed integrally with the holder 100 by cutting out three sides as in forming the clips 102 and 104, as shown more clearly in FIG. 22. Similar clips may be formed in certain paper sheets of a set, if desired. Such clips have a particular advantage over slits in a carrier in that the corners of the sheets may be attached by merely sliding the corners under the clips.

As shown more clearly in FIGS. 21 and 22, the clips 102 and 118 are slightly upstanding at their entrance edges from the surface of the holder 100, so that the sheets 106 or 107 will slide easily under the clips; also that with either of the clips a sheet when inserted under one of the clips will automatically be interlocked into fixed relation with the holder, on that side. For example, with the clips 102 the sheets 106 coengage with the notches 108 in the record sheets, thereby positively locking the sheets in any desired adjusted position in longitudinal relation with the holder. Likewise the diagonal clips 118 which are in transversly offset relation are coengageable with the corners of a sheet 107, as indicated in FIG. 22 to lock it in fixed relation with the holder. The clips 118 may be formed in sheets 106 and the sheet 107 attached to one of said sheets. In either case the user has only one to three coengagements to make between the holder and the sheets to be attached thereto, instead of having a confusingly large number of projections on the record sheets to be inserted in a correspondingly large number of apertures in the holder.

The coengagement of the clips and notches in my improved combination is greatly facilitated by the provision of at least one sheet positioning guide on the holder to register with a line or space to be written upon on a record sheet instead of a large number of numerals on the holder and sheets to be placed in registry according to the adjusted positions of the record sheets. Also by having at least one positioning guide in constantly fixed relation to the column headings borne by the lower end of the flap 116, entries are facilitated by rendering practically impossible errors which occur by eye shifting in beginning a writing line to a different horizontal writing line and also errors which occur by eye shifting at the top of a column to a different column below.

The holder, as well as the record sheets, can be tailored to fit the requirements of practically any type of records usage.

Various devices have previously been designed for assembling record sheets in the correct relation for the simultaneous typing of an entry in the proper location on several overlapping sheets, but such devices have been defficient in practice mainly for the reason that all the sheet supporting or anchoring elements such as coengaging projections, hooks, perforations and other coengaging means for holding record sheets in assembled relation have been formed as integral parts of the record sheets, thereby providing flimsy anchoring elements which are not only difficult to engage, even when new, but subject to such deformation as to render them practically impossible of engagement.

A further serious deficiency of the previous devices referred to is that no positive means or guides for positioning the sheets in constant fixed relation between a writing line and column headings, which would bring the column headings and the writing lines next to each other, has been provided, such as is provided by using the lower edge of the flap 116 as a ruler and column guide. Another serious deficiency of previous devices is that by employing a multiplicity of numbers or other characters on each one of the record sheets to be assembled in one writing line position it is necessary to pick out a number or character on each sheet and after doing so to bring each sheet together at the number selected. This would mean keeping in memory numbers or characters having no relation to the actual figures or data being recorded. This also was not a positive means of assembling the sheets for the reason that the numbers or characters on one sheet are obscured by the sheets overlapping them. These deficiencies are entirely precluded by one of my positioning guides 114 which is in a permanently fixed position which is always visible.

I have found it to be essential in assembling a plurality of sheets for the typing of entries on the various sheets in correct relation that one of the elements of interfitting and locking coengagement be made of a stiffer, stronger and more durable material than is usually the case of the material from which the sheets are made. For example, as shown in FIG. 4, a stiff plastic pin 16 may be attached to the sheet 18 for insertion in apertures 14 in folds of a plastic holder 10, or, as shown in FIG. 8, plastic strips 42 may be attached to sheet 18 to be bent into notches 40 in the holder 10. In either design, a single element on the edge of the record sheet is guided into coengagement with a formation on or in the holder in correct alignment, both transversely and longitudinally, by means of at least one of the aligned positioning guides 22.

In FIGS. 19 to 23 is shown a form of my invention in which one of the edges of the record or face sheets 106 is provided with notches of square or other suitable rectilinear shape, and the plastic holder 100 is provided with rectilinear clips 102 for engagement with a selected notch, as guided by one of the positioning guides 114. In this design the holder is also provided with a flap 116 for shielding the clips 102 from damage by the typing machine and also providing a space at the bottom for indicating the headings on the record sheet, either by writing them on the flap or by writing them on a strip 124 inserted through loops 122 or other suitable apertures in the record sheet, for the purpose of creating fixed column headings in constant relation to the writing line, whereas in prior devices the column headings are moved farther away from and with each line written upon.

In FIGS. 24 to 32 are shown further modifications of my invention, in each of which both the holder and the elements and formations for holding the record sheets on the holder are either formed in the plastic holder or formed separately of plastic or other suitable material of a greater strength, stiffness and durability than that of the paper of the record sheets and fixedly attached to the record or face sheets by suitable means.

In FIGS. 24, 25 and 26, the holder **100*a* has a row of clips 102*a* on, at least, one edge, and attached to each of the record sheets 106*a* is a sheet carrier strip 108*a* of plastic or other suitable strong material and having in its end a notch 108*b*, for engagement with a selected clip 102*a*, as guided by one of the positioning guides 114*a*, this strip being attached to the record sheet by loops 122*a* formed by transversely spaced slits on the record sheet in the same manner as the loops 122 for attaching the heading strip 124, as shown in FIG. 19. This, in effect, is a reversal of the arrangement shown in FIGS. 19 to 23, but it also has a particular advantage in that it eliminates the necessity of utilizing the edges of the record sheets in the formation of notches, projections or other means for attaching the sheets to a holder. The carrier strip 108*a* projects beyond the edge of the face sheet to which it is attached, and the notch 108*b* is formed in the projecting portion, thus providing prongs on opposite sides of the notch, the strip being of such width as to permit the projection of the prongs between the clip 102*a* engaged with the notch and the clips on each side, as shown. As shown in FIG. 24 the holder 100*a* may be provided with a flange 12*a* below the row of clips 102*a* and also a flange 12*b* on the opposite side for inclosing the record sheets 106*a*. The holder may also be provided with a flap 116*a* of the same design as the flap 116** shown in FIGS. 19 and 20, and for the same purpose.

In FIGS. 27, 28 and 29, the strip **108*b* is provided at one or both ends with a downwardly bent clip 102*b* for engagement with vertical rectilinear apertures 108*d* in the holder 100*b* which apertures may, if desired, be in the form of notches open at the edge of the holder. The strip 108*b* is attached to the record sheet 106*b* by the same means as that of the strip 108*a*. The edges of the holder may be provided with folded flanges 12*a* and 12*b* the same as with the holder 100*a***.

In FIGS. 30 to 32, the edges of the holder **100*c* are folded to form flanges 12*c* the same as shown in FIG. 1. Projections 16*a* are formed on strips 108*c* for insertion in narrow apertures 14*a* in, at least, one of the folds of holder 100*c* forming the flanges 12*c*. The strips 108*c* are attached to the record sheets 106*c* by loops 122*a* the same as the strips 108*a* and 108*b***.

In all the forms of my invention illustrated and hereinbefore described, the holder for the record sheets is made separately from the record sheets, and is preferably made of a stronger and stiffer material than the paper of the record sheets. Moreover, at least one of the elements or formations for supporting the record sheets on, or in, the holder may be an integral part of the holder. In other forms of my invention both elements or formations for supporting the sheets on, or in, the holder may be integral parts either of the holder, or of strips or other elements made of a stronger material than that of the record or other sheet and attached thereto by suitable means. In each of the forms of my invention at least one sheet positioning guide is provided as an essential part of my invention. Although a more positive means for attaching the sheets to the holder is provided by having the supporting elements or formations on both edges of the sheets, the sheets may be effectively placed and supported in the holder on a particular line of writing, with means of attaching on only one edge.

Either of the plastic strips **108*a*, 108*b* or 108*c* can easily and quickly be inserted in a record sheet and removed for insertion in another sheet having the necessary loops 122*a***. Since such strips are very inexpensive, a strip may remain attached to a record sheet until it is filled with record entries, and then removed to be attached to a new sheet.

As shown in FIG. 33, coinciding loops **122*a* and 122*b* may be formed on the record sheet 106*a*, 106*b* and 106*c* and also on a carbon sheet 106*d***, so that the strip will be inserted simultaneously through one or more of the loops on both the record and the carbon sheet.

Although the strips **108*a*, 108*b* and 108*c*** have been shown and described as being attached to the record sheet and to a carbon sheet by means of loops formed in the sheets by means of transversely spaced slits, it should be understood that the strips can be inserted through single slits or other forms of apertures in the sheets.

In FIGS. 34, 35, 36 and 37 are shown further modified means for attaching to each record or face sheet a separate carrier strip provided at one or both ends with means for attaching it to the sheet holder, such means in the forms illustrated comprising, for example, a single projection for insertion between clips or other projections on the sheet holder or through openings therein, such as clips 102*a,* shown in FIG. 24 and such as openings 14 or 14*a,* as shown in FIGS. 1 and 31 or with other formations for interlocking coengagement with complementary formations on the sheet holder. A particular advantage of the sheet attaching means referred to is that the strips can be more easily attached to the record or face sheets and with the top edges of the strips and sheets in coincidence, instead of having the strips inserted through loops or apertures below the tops of the sheets, as shown in FIGS. 24, 27 and 30.

In the form of my invention shown in FIGS. 34–36 each carrier strip 108*d'* has punched out, inwardly projecting, clips 102*b* at its ends for engagement in marginal notches 122*b* in the record or face sheet 106*d* and also has intermediate clips 102*c* apposed to each other longitudinally of the sheet for engagement with a notch 122*c* on the top edge of the record sheet, and a transverse slit 122*d* some distance below the top of the sheet 106*d.* The carrier strip 108*d'* is also provided on, at least, one end with an integral projection 16*d* for insertion of aperture, or between a pair of clips, in a sheet sholder, such, for example, as the holder 10 or 100*c*, as shown, respectively in FIGS. 1 and 30.

The carrier strip 108*a'* shown in FIG. 37 may be identical with the strip 108*d'*, except that it is provided on at least one end with a notch 109*e* for engagement with a clip 102 or 102*a*, as shown, respectively in FIGS. 19 and 24. Accordingly, the same reference numerals as in FIGS. 34–36 are used to designate the clips 102*b* and 102*c* in FIG. 37.

In FIG. 38 the carrier strip 108*d'* (of FIG. 34) is shown with the projection 16*b* inserted endwise in close interfitting engagement between two of the clips 102*a* on the holder 100*a*, of the type shown in FIG. 24, the strip being of such width that its end portions on each side of the projection will slide under the clips 102*a* located on each side of the projection, thereby firmly, but detachably anchoring the strip and the sheet carrier by it to the holder, in the same manner that the sheet 100 as, shown in FIG. 21, is anchored.

The sheet holder 100*d* shown in FIG. 39 is provided with at least one longitudinal row of clips 102*d*, of the same character as the clips 102 and 102*a*, shown in FIGS. 19 and 24 and the record or other type of sheet 106*d* is provided along its top edge with a multiplicity of rectilinear notches or openings 108*d''* for selective coengagement with the clips 102*d*, so that the sheet 106*d* can be shifted to various anchored positions either laterally or longitudinally of the holder 100*d*. The edge of the sheet 106*d* opposing the notched edge is supported by one of the transverse clips 102*e* arranged in opposed relation to the clips 102*d*. As shown in FIG. 40, both the clips 102*d* or the clips 102*e* may be pushed either rearwardly or forwardly for supporting a sheet 106*d* on the front of the holder and the sheet 106*d* on the back of the holder. Obviously for certain purposes it would be sufficient to provide a holder having only one clip 102*d* opposed by a single clip 102*e* and the sheet 106*d* provided with only a single notch for quick engagement with the holder, such, for example, as a check, or the like, upon which there is to be only one typing of information thereon or a sheet such as a journal sheet which would not be moved in relation to aforesaid holder with each line posting.

The sheet 106*e* illustrated in FIGS. 41 and 42 may be in the form of a check or other paper upon which information is to be typed only once, or such sheet as would not be moved in relation to said holder until all line postings were made, and this check or journal sheet, or the like, may be provided with a notch 108*e* for coengagement with a clip 102*f* preferably punched out in a holder 100*e* having a marginal return bent flange 12*d* under which the edge of the check or other sheet may be inserted. This will aid the clip 102*e* in holding it in the correct position. However, the check may be placed in any holder having, at least, one clip for engagement with the notch 108*e*. Obviously, a projection for insertion in an aperture or between a pair of clips on the holder may be substituted for the notch 108*e*.

In the modification shown in FIG. 43 the holder 100*f* has a projection 16*c* extending outwardly from its edge in close interfitting engagement with an opening 108*e'* in the face sheet 106*f*.

In the modification shown in FIG. 44 the holder 100*g* has another form of projection or clip 102*g* extending outwardly from a location near its edge in close interfitting engagement with the opening 108*e''* in the face sheet 106*f*.

It should be understood that in providing a complete set of record sheets for businesses of various types any of the several assemblies hereinbefore described or any combination thereof may be necessary or, at least, advantageously employed.

It will be noted that holder for the sheet and the carrier for the sheet have been described as being made of plastic sheet material or the like, the reason being that the holder and carrier are to be used repeatedly over a longer period of time, whereas, the record sheets are filed away after they have been filled with the necessary information.

However, it is possible to make the holder and carrier out of a strong sheet material other than plastic material. Therefore, holders and carrier elements made of strong paper, for example, would lie within the scope of my invention.

Although in many instances it is advantageous to provide coengaging means for locking both edges of a record sheet to the holder or carrier, in many other cases it is sufficient to provide locking means for only one edge of the sheet. Therefore, it is within the scope of my invention to provide positive locking means for only one edge of the sheet, as set forth in the appended claims.

Likewise, in some instances it is advantageous to provide sheet positioning guides at each edge of the holder, whereas, in many other instances it is sufficient to provide a single positioning guide on only one edge of the holder. Accordingly, it is within the scope of my invention to provide a positioning guide on only one edge of the holder, as claimed.

As has been pointed out in the foregoing description there are certain conditions in which it is advantageous to attach one or all the record sheets of a set to separate carriers, the latter being provided with means for attaching them to the holder, as claimed.

From the foregoing description it can be seen that my invention comprises not only a very inexpensive and efficient special holder for record sheets to enable an operator to type or handwrite all the essential records of account at one time, but it also includes record sheets with means especially adapted for use with the holder, thus providing a new means of multiple recording for bookkeeping or other records, as well as the holding means for filing of sheets in loose-leaf or other books, so that the same record sheets may be easily and quickly disengaged or coengaged for recording of information, and other records.

Obviously, various changes or modifications may be made in the construction of the holder, as well as in the design and arrangement of the record sheets adapted for use with the holder without departing from the spirit and scope of my invention. Therefore, it should be understood that the forms of the invention shown and described are intended to be illustrative only, and restricted only by the appended claims.

I claim:

1. In combination, a flat sheet holder of the character described and a face sheet for removable attachment thereto with means on, at least, one vertical marginal side edge portion of the holder and means on, at least, one vertical marginal side edge portion of the face sheet, interlocking one with the other, said means comprising two devices, one being, at least one notch and the other being, at least one clip-like projection with one end fixedly joined to one of the vertical marginal edge portions aforesaid for interlocking engagement with the inner portion of the notch between the edges of the notch adjacent to the inner portion of the notch and extending parallel to the sides of the notch over, and beyond, the inner edge thereof, the inner portion of said notch being of substantially the same width as the portion of said projection joined to the marginal edge portion, whereby said face sheet is attached to said holder by close interfitting, interlocking engagement of said projection with said notch.

2. A combination holder and face sheet as in claim 1 in which one of said vertical side edge portions is provided with a multiplicity of one of said interlocking devices.

3. A combination holder and face sheet as in claim 1 and including a single fixed sheet positioning guide on ine of the vertical marginal edge portions of said holder.

4. A combination holder and face sheet as in claim 1 and including a frontal flap extending from one edge of said holder over said interlocking devices, when in interlocked relation, and over said sheets to a plane slightly short of said positioning guide for shielding said devices from the rollers of a typing machine and for bearing column headings on the lower end surface of said flap corresponding to columns on said face sheet.

5. In combination, a flat record sheet holder of the character described and a record sheet for removable attachment thereto, said record sheet having along its outer marginal edges, a multiplicity of pairs of transversely aligned, rectilinear notches, said holder having, at least, a pair of transversely aligned clips with their outer ends fixedly joined to opposite marginal portions of said holder, at positions substantially below the top of said holder, said clips extending inwardly with their inner, free ends opposed to each other and slightly raised from the surface of said holder, the distance between the outer ends of said clips being substantially equal to the width of said record sheets measured between the inner edges of said notches, said notches being of substantially the same width as the portion of said clips joined to the holder, whereby said record sheet is attached to said holder by close interfitting engagement of said notches with said clips.

6. A combination holder and record sheets in claim 5 including a single pair of fixed and transversely opposed sheet positioning guides on opposite marginal portions of said holder at a position substantially below the top end of said holder.

7. A combination holder and record sheet as in claim 6 in which said positioning guides are below said clips and which includes a frontal flap extending from the top of said holder over said clips and said sheet to a plane slightly short of said positioning guides for shielding said clips from the rollers of a typing machine, and for bearing column headings on the lower end surface of said flap corresponding to columns on said record sheet.

8. In combination, a flat sheet holder of the character described and a face sheet for removable attachment thereto, said holder having a multiplicity of projections with one end of each projection fixedly joined to said holder; and a flat carrier strip for attachment to said sheet, said strip and face sheet being provided with interfitting means for attaching said strip to said sheet with one end of said strip substantially flush with the adjacent edge of said face sheet, said strip having a single projection extending outwardly from said end thereof for insertion between a pair of said first mentioned projections, said single projection being of substantially the same width as that of the space between a pair of said first mentioned projections, and said strip being of sufficient width on each side of said single projection for insertion of the end portion of said strip, and the portion of said face sheet underlying said portion, under said pair of projections, whereby said face sheet is attached to said holder in close interfitting engagement of said single projection between said pair of projections.

9. A combination as in claim 8 in which the holder is provided with a return bent overlapping flange on, at least, one edge and having a multiplicity of openings in the bent portion, and in which the single projection is of substantially the same width as that of said openings and is insertable through one of said openings with the adjacent end portion of said strip and the portion of said face sheet underlying said portion inserted under said flange, whereby said face sheet is attached to said holder in close interfitting engagement of said single projection in one of said openings.

References Cited by the Examiner

UNITED STATES PATENTS

| | | | |
|---|---|---|---|
| 1,299,643 | 4/1919 | Werney | 282—29.3 X |
| 1,330,871 | 2/1920 | Hexter | 282—29.3 |
| 1,369,312 | 2/1921 | Wherry | 282—29.3 X |
| 1,769,610 | 7/1930 | Vogel | 40—124 |
| 1,850,362 | 3/1932 | Vogel | 40—124 |
| 2,095,792 | 10/1937 | Cooper | 282—29.3 |
| 2,432,363 | 12/1947 | Wrigley | 282—29.3 |
| 2,629,612 | 2/1953 | St. John | 282—29.3 |

EUGENE R. CAPOZIO, *Primary Examiner.*

LAWRENCE CHARLES, JEROME SCHNALL, *Examiners.*